US011286396B2

(12) United States Patent
Luo et al.

(10) Patent No.: US 11,286,396 B2
(45) Date of Patent: Mar. 29, 2022

(54) LIGHT DIFFUSING AND REFLECTIVE COATINGS

(71) Applicant: PPG Coatings (Tianjin) Co., Ltd., Tianjin (CN)

(72) Inventors: Zhengsong Luo, Suzhou New District (CN); Wenfu Yang, Suzhou New District (CN); Gehong Zhang, Tianjin (CN); John Robert Schneider, Sharpsburg, PA (US); Wei Wang, Allison Park, PA (US)

(73) Assignee: PPG COATINGS (TIANJIN) CO., LTD., Tianjin (CN)

( * ) Notice: Subject to any disclaimer, the term of this patent is extended or adjusted under 35 U.S.C. 154(b) by 243 days.

(21) Appl. No.: 16/088,999

(22) PCT Filed: Mar. 30, 2016

(86) PCT No.: PCT/CN2016/077862
§ 371 (c)(1),
(2) Date: Sep. 27, 2018

(87) PCT Pub. No.: WO2017/166121
PCT Pub. Date: Oct. 5, 2017

(65) Prior Publication Data
US 2019/0106576 A1 Apr. 11, 2019

(51) Int. Cl.
| | |
|---|---|
| *C09D 5/33* | (2006.01) |
| *C09D 7/61* | (2018.01) |
| *C09D 7/65* | (2018.01) |
| *C09D 7/40* | (2018.01) |
| *C09D 133/02* | (2006.01) |
| *B32B 27/20* | (2006.01) |
| *C08K 3/22* | (2006.01) |
| *C08K 3/013* | (2018.01) |

(52) U.S. Cl.
CPC ............... *C09D 7/69* (2018.01); *B32B 27/20* (2013.01); *C09D 7/61* (2018.01); *C09D 7/68* (2018.01); *C08K 3/013* (2018.01); *C08K 2003/2241* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 6,331,326 B1 * | 12/2001 | Tsunoda | B05D 5/068 427/202 |
| 7,677,743 B2 | 3/2010 | Hsu et al. | |
| 2004/0039114 A1 * | 2/2004 | Yamauchi | C08F 2/22 524/801 |
| 2008/0030860 A1 | 2/2008 | Chang | |
| 2009/0017294 A1 | 1/2009 | Poole et al. | |
| 2009/0297860 A1 * | 12/2009 | Sasaki | B32B 27/302 428/423.7 |
| 2009/0317630 A1 | 12/2009 | Liu et al. | |
| 2012/0321874 A1 | 12/2012 | Shim et al. | |
| 2014/0255608 A1 | 9/2014 | Eibon et al. | |

FOREIGN PATENT DOCUMENTS

| | | |
|---|---|---|
| CN | 1127278 A | 7/1996 |
| CN | 101395230 A | 3/2009 |
| CN | 101494130 A | 7/2009 |
| CN | 101552817 A | 10/2009 |
| CN | 102135266 A | 7/2011 |
| CN | 102496509 A | 6/2012 |
| CN | 102832070 A | 12/2012 |
| CN | 104479486 A | 4/2015 |
| JP | H09328630 A | 12/1997 |
| JP | 2013-509484 A | 3/2013 |
| KR | 2001-0054248 A | 7/2001 |
| WO | 2008104502 A1 | 9/2008 |
| WO | 2014192351 A1 | 12/2014 |

OTHER PUBLICATIONS

The International Search Report and The Written Opinion of the International Searching Authority for International Application No. PCT/CN2016/077862, 12 pages.
The International Search Report and The Written Opinion of the International Searching Authority for International Application No. PCT/CN2016/077862, 12 pages, dated Oct. 26, 2016.

* cited by examiner

*Primary Examiner* — Cheng Yuan Huang
(74) *Attorney, Agent, or Firm* — Michael J. Grese

(57) ABSTRACT

A multi-layer coating that transmits and reflects light can include a first coating layer and a second coating layer applied over the first coating layer. The first coating layer is prepared from a coating composition that includes a film forming resin, crosslinked organic particles, and inorganic pigment particles. The crosslinked organic particles and the inorganic pigment particles each have a refractive index that is different from the refractive index of the film forming resin. The second coating layer is prepared from a coating composition that includes a film forming resin and reflective and/or translucent particles.

20 Claims, No Drawings

LIGHT DIFFUSING AND REFLECTIVE COATINGS

FIELD OF THE INVENTION

The present invention relates to coatings that transmit and reflect light, substrates at least partially coated with the coatings, and methods of forming such coatings.

BACKGROUND OF THE INVENTION

Standard backlit systems for consumer electronic devices include a light source, a substrate, and multiple coating layers that at least partially transmit light. For instance, a standard backlit keyboard system comprises a light source, plastic keys, and white, black, and clear coating layers deposited over the plastic keys. A portion of the black layer is removed to display the symbol the key is to represent. The white and clear coating layers are designed to at least partially transmit light so that letters and numbers appear illuminated through the key symbol from the light source. Because at least some of the coating layers must transmit light, the colors and appearance of current backlit systems for consumer electronic devices are limited.

Considerable efforts have been expended in developing different coating layers for backlit systems. However, these coatings have various drawbacks. For example, a considerableamount of energy is often required to drive light through these alternative coating layers. Thus, it is desirable to provide new coating systems for backlit systems of consumer electronic devices that overcome the drawbacks associated with current coatings.

SUMMARY OF THE INVENTION

The present invention is directed to a multi-layer coating that transmits and reflects light. The multi-layer coating can include a first coating layer prepared from a coating composition containing a film forming resin, crosslinked organic particles, and inorganic pigment particles. The crosslinked organic particles and the inorganic pigment particles can each have a refractive index that is different from the refractive index of the film forming resin. The multi-layer coatingcan further include a second coating layer applied over the first coating layer. The second coating layer can be prepared from a coating composition containing a film forming resin and reflective and/or translucent particles.

The present invention is also directed to substrates at least partially coated with the coating compositions described herein.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" film forming resin, "a" crosslinked organic particle, "an" inorganic pigment particle, and the like refer to one or more of any of these items.

As indicated, the present invention is directed to a light diffusing basecoat. The term "light diffusing" refers to a coating that transmits rays of visible light. Further, as used herein, the term "polymer" refers to prepolymers, oligomers and both homopolymers and copolymers. The term "resin" is used interchangeably with "polymer".

The light diffusing basecoat can be used as a first coating layer that is formed from a coating composition that includes a film-forming resin, crosslinked organic particles, and inorganic pigment particles. As used herein, a "film-forming resin" refers to a resin that can form a self-supporting continuous film on at least a horizontal surface of a substrate upon removal of any diluents or carriers present in the composition or upon curing.The film-forming resin can include any of a variety of thermoplastic and/or thermosetting film-forming resins known in the art. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or cross-linking reactions also may be carried out under ambient conditions. Once cured or crosslinked, a thermosetting resin will not melt upon the application of heat and is insoluble in solvents. As noted, the film-forming resin can also include a thermoplastic film-forming resin. As used herein, the term "thermoplastic" refers to resins that include polymeric components that are not joined by covalent bonds and thereby can undergo liquid flow upon heating and are soluble in solvents.

Non-limiting examples of suitable film-forming resins include (meth)acrylic resins. As used herein, "(meth)acrylic" and like terms refers both to the acrylic and the corresponding methacrylic. Other non-limiting examples of suitable film-forming resins includepolyurethanes, polyesters, polyamides, polyethers, polysiloxanes, epoxy resins, vinyl resins, copolymers thereof, and mixtures thereof. Appropriate mixtures of film-forming resins may also be used in the preparation of the present coating compositions.

The film-forming resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), and combinations thereof. The term "reactive functional group" refers to an atom, group of atoms, functionality, or group having sufficient reactivity to form at least one covalent bond with another reactive group in a chemical reaction. Alternatively, the film forming resin of the coating composition used to form the basecoat is completely free of reactive functional groups.

Thermosetting coating compositions typically comprise a crosslinker that may be selected from any of the crosslinkers known in the art to react with the functionality used in the coating compositions. As used herein, the term "crosslinker" refers to a molecule comprising two or more functional groups that are reactive with other functional groups and which is capable of linking two or more monomers or polymer molecules through chemical bonds. Alternatively, a thermosetting film-forming resin can be used having functional groups that are reactive with themselves; in this manner, such thermosetting resins are self-crosslinking.

Non-limiting examples of crosslinkers include phenolic resins, amino resins, epoxy resins, beta-hydroxy (alkyl) amide resins, alkylated carbamate resins, isocyanates, polyacids, anhydrides, organometallic acid-functional materials, polyamines, polyamides, aminoplasts, and combinations thereof.

The film-forming resin can comprise at least 40 weight %, at least 50 weight %, or at least 60 weight % of the light diffusing coating composition, based on the total solids weight of the light diffusing coating composition. The film-forming resin can comprise up to 90 weight %, up to 80 weight %, or up to 70 weight % of the light diffusing coating composition, based on the total solids weight of the light diffusing coating composition. The film-forming resin can also comprise a range such as from 40 weight % to 90 weight %, or from 50 weight % to 80 weight % of the light diffusing coating composition, based on the total solids weight of the light diffusing coating composition.

The coating composition used to form the light diffusing basecoat can also include crosslinked organic particles. As used herein, "crosslinked organic particles" refers to organic particles that are linked together through chemical bonds. The crosslinked organic particles can have an average particle size of at least 0.1 micron, at least 0.5 micron, at least 1 micron, or at least 1.5 microns. The crosslinked organic particles can have an average particle size of up to 10 microns, up to 7 microns, up to 5 microns, up to 4.5 microns, up to 4 microns, up to 3.5 microns, or up to 3 microns. The crosslinked organic particles can also have an average particle size ranging from 0.1 micron to 10 microns, 0.5 micron to 5 microns, or 1 micron to 4.5 microns. As used herein, "average particle size" refers to the mean (average) particle size of the total amount of particles in a sample. The average particle size is determined with a Malvern Mastersizer 2000 laser diffraction particle size analyzer following the instructions described in the Malvern Mastersizer 2000 manual.

The crosslinked organic particles can also have a size distribution of at least 1 micron, at least 2 microns, at least 2.5 microns, or at least 3 microns. The crosslinked organic particles can have a particle size distribution of up to 3.5 microns, up to 4 microns, up to 4.5 microns, up to 5 microns, up to 6 microns, up to 7 microns, or up to 8 microns. The crosslinked organic particles can have a particle size distribution ranging from 1 micron to 8 microns, 2 microns to 6 microns, or 2.5 microns to 5 microns. As used herein, "particle size distribution" refers to the single number that constitutes the difference between the upper and lower limit of the particle size range. The particle size distribution is determined with a Malvern Mastersizer 2000 laser diffraction particle size analyzer following the instructions described in the Malvern Mastersizer 2000 manual.

Non-limiting examples of crosslinked organic particles include methyl (meth)acrylate particles, styrene particles, acrylonitrile particles, silicone particles, polymethyl urea particles, vinyl acetate particles, sulfur-containing particles such as polysulfide particles, fluoro-containing particles such as polyvinylidene fluoride, and combinations thereof.

The crosslinked organic particles can comprise at least 2.5 weight %, at least 5 weight %, or at least 10 weight % of the light diffusing coating composition, based on the total solids weight of the light diffusing coating composition. The crosslinked organic particles can comprise up to 30 weight %, up to 20 weight %, or up to 15 weight % of the light diffusing coating composition, based on the total solids weight of the light diffusing coating composition. The crosslinked organic particles can comprise range such as from 2.5 weight % to 30 weight %, or from 5 weight % to 15 weight % of the light diffusing coating composition, based on the total solids weight of the light diffusing coating composition.

The coating composition used to form the light diffusing basecoat can further include inorganic pigment particles. As used herein, "inorganic pigment particles" refers to an inorganic material which is capable of materially contributing to the opacity or hiding capability of a coating. Non-limiting examples of suitable inorganic pigment particles include titanium dioxide, zinc oxide, barium sulfate, calcium carbonate, talc, and combinations thereof. The inorganic pigment particles can be added to the coating composition in any suitable form, such as discrete particles, dispersions, solutions, and/or flakes. The inorganic pigment particles can also be incorporated into the coatings by use of a grind vehicle, such as an acrylic grind vehicle, the use of which will be familiar to one skilled in the art.

Different types of inorganic pigment particles can be combined at certain amounts to form specific pigment blends, based on the total solids weight of the inorganic pigment particles and the crosslinked organic particles. For instance, the coating compositions used to prepare the light diffusing basecoat can include a pigment blend of (i) titanium dioxide and (ii) at least one other inorganic pigment particle in which the titanium dioxide comprises less than 30 weight % of the total solids weight of the inorganic pigment particles and the crosslinked organic particles. In such pigment blends, the titanium dioxide can comprise less than 20 weight %, less than 15 weight %, less than 10 weight %, less than 8 weight %, or less than 6 weight %, based on the total solids weight of the inorganic pigment particles and the crosslinked organic particles. In such pigment blends the titanium dioxide can comprise at least 1 weight % or at least 3 weight % of the total solids weight of the inorganic pigment particles and the crosslinked organic particles. The titanium dioxide can also include a range such as from 1 weight % to 30 weight %, or from 1 weight % to 20 weight %, or from 1 weight % to 15 weight %, or from 1 weight % to 10 weight %, based on the total weight of the inorganic pigment particles and the crosslinked organic particles. Non-limiting examples of the at least one other inorganic pigment particle (ii) can include any of the inorganic pigment particles described above such as zinc oxide, barium sulfate, calcium carbonate, talc, and any combination thereof.

It has been found that a pigment blend of different inorganic pigment particles at certain amounts, such as the pigment blend previously described, helps form a coating with good hiding while still allowing a significant amount of light to diffuse through the coating.

The inorganic pigment particles can comprise at least 5 weight %, at least 10 weight %, or at least 20 weight % of the light diffusing coating composition, based on the total solids weight of the light diffusing coating composition. The inorganic pigment particles can comprise up to 50 weight %, up to 40 weight %, or up to 30 weight % of the light diffusing coating composition, based on the total solids weight of the light diffusing coating composition. The inorganic pigment particles can also comprise from 5 weight % to 50 weight % or from 10 weight % to 40 weight % of the light diffusing coating composition, based on the total solids weight of the light diffusing coating composition.

The crosslinked organic particles and the inorganic pigment particles described herein can both have a different refractive index than the film-forming resin. As used herein, "refractive index" refers to the absolute refractive index of a material that is the ratio of the speed of radiation in free space to the speed of the radiation in that material. The refractive index can be measured using known methods and is generally measured using a Bausch and Lomb Refractometer. The difference between the refractive index of the film-forming resin and the refractive index of the crosslinked organic particles and/or the inorganic pigment particles can be at least 0.01, at least 0.05, or at least 0.1. Further, the difference between the refractive index of the film-forming resin and the refractive index of the crosslinked organic particles and/or the inorganic pigment particles can be up to 0.15 or 0.2. The difference between the refractive index of the film-forming resin and the refractive index of the crosslinked organic particles and/or the inorganic pigment particles can also range from 0.01 to 0.2, or from 0.1 to 0.2, or from 0.1 to 0.15.

Other pigment particles can also be used to form the light diffusing basecoat. For example, other pigment particles can include those used in the paint industry and/or listed in the Dry Color Manufacturers Association (DCMA). Example pigments and/or pigment compositions include, but are not limited to, carbazoledioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketopyrrolo pyrrole red ("DPPB O red"), carbon black, and mixtures thereof.

Dyes and tints can also be incorporated into the coating compositions. Example dyes include, but are not limited to, those that are solvent and/or aqueous based such as phthalo green or blue, iron oxide, bismuth vanadate, anthraquinone, and peryleneandquinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Further, the coating composition used to form the light diffusing basecoat can have a weight ratio of pigment particles to film-forming resin of at least 1:1, at least 1:1.5, or at least 1:2. The coating composition used to form the light diffusing basecoat can also have a weight ratio of pigment particles to film-forming resin of up to 1:10, up to 1:5, or up to 1:4. The coating composition used to form the light diffusing basecoat can also have a weight ratio range of pigment particles to film-forming resin such as from 1:1 to 1:10 or from 1:1.5 to 1:5.

The film-forming resin, crosslinked organic particles, inorganic pigment particles, and any other additional materials can all be mixed together in a liquid medium and applied to a substrate to form the light diffusing basecoat. The liquid medium can include a non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up at least 50 weight % of the liquid medium include organic solvents. Non-limiting examples of suitable organic solvents include glycols, glycol ether alcohols, alcohols, ketones, glycol diethers, esters, and diesters. Other non-limiting examples of organic solvents include aromatic and aliphatic hydrocarbons.

After mixing the film-forming resin, crosslinked organic particles, inorganic pigment particles together, and any other material in a liquid medium, the mixture can be applied to a wide range of substrates known in the coatings industry. For example, the coatings of the present invention can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Non-metallic substrates may be polymeric including plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, or may be wood, veneer, wood composite, particle board, medium density fiberboard, cement, stone, glass, paper, cardboard, textiles, leather, both synthetic and natural, and the like. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc—aluminum alloy, and aluminum plated steel.

The coatings of the present invention are particularly useful when applied to plastic substrates that are placed over a light source such as those commonly found with consumer electronic products. For example, the coatings of the present invention can be applied to plastic substrates found on keyboards of home desktop computers, laptops, tablets, cellular phones, other handheld electronic devices, and the like. These devices can include any type of light source known in the art to provide illumination. For instance, an LED (light-emitting diode) light source can be used to illuminate key caps found on a keyboard of a home desktop computer or a laptop and upon which the light diffusing basecoat is applied.

The light diffusing coatings formed from the coating compositions described herein can be applied by any means standard in the art, such as electrocoating, spraying, electrostatic spraying, dipping, rolling, brushing, and the like. After the coating compositions are applied to a substrate, the compositions can be dried or cured at ambient conditions, with heat, or with other means such as actinic radiation. As used herein, "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV), X-ray, and gamma radiation.

The light diffusing coatings can be applied to a dry film thickness of 1 micron to 50 microns, 1 micron to 30 microns, or 5 microns to 20 microns.

The light diffusing coating compositions described herein have been found to form a coating with good hiding that also allows a significant amount of light to diffuse through the coating. For example, the light diffusing coatings can have an L value measured at a 15° angle of at least 40, at least 60, at least 85, or at least 95. As used herein, "L value" refers to the measure of the opacity of a film or coating. The greater the L value, the greater the opacity, which in turn provides a coating with better hiding. The L value is determined by a GretagMacBeth Color-Eye® 2145 Spectrophotometer using the CIE94 color system and L*a*b* coordinates and following the instructions described in the GretagMacBeth Color-Eye® 2145 Spectrophotometer manual. At the same time, the light diffusing coatings can also have a light transmittance of at least 10%, at least 20%, at least 30%, or at least 45%. As used herein, "light transmittance" refers to the amount of light that passes through a coating or film divided by the total amount of light incident upon the sample. Light transmittance is determined with a NIPPON DENSHOKU, NDH 2000N Turbidity (Haze) Meter following the instructions described in the NIPPON DENSHOKU, NDH 2000N Turbidity (Haze) Meter manual.

As indicated, a second coating layer can be applied over the light diffusing basecoat, which acts as a first coating layer. The second coating layer can be applied directly over the first coating layer without any material positioned in between. The second coating layer can be formed from a composition that includes a film-forming resin. The film-forming resin can include any one or combination of film-forming resins described above. For example, the film-forming resin can include a (meth)acrylic resin. The film-forming resin used to prepare the second coating layer can be the same or different than the film-forming resin used to prepare the light diffusing basecoat, which acts a first coating layer.

The film-forming resin of the coating composition used to form the second coating layer can comprise at least 60 weight %, at least 70 weight %, or at least 80 weight % of the second coating composition, based on the total solids weight of the second coating composition. The film-forming resin used to form the second coating layer can comprise up to 90 weight %, up to 95 weight %, or up to 99 weight % of the second coating composition, based on the total solids weight of the second coating composition. The film-forming resin used to form the second coating layer can comprise a range such as from 60 weight % to 99 weight % or from 80 weight % to 95 weight % of the second coating composition, based on the total solids weight of the second coating composition.

The coating composition used to form the second coating layer can also include reflective and/or translucent particles. As used herein, "reflective particles" refers to particles whose size, structure, texture, including the thickness of the layer or layers thereof as well as their physical and chemical nature allow the particles to reflect incident light. Further, "translucent particles" refers to particles that allow at least partial transmission of light with some degree of distortion regardless of whether or not the light is scattered by the particles. For instance, the translucent particles used with the present invention can be chosen to allow a light transmittance of at least 10%, or at least 20%, or at least 25%, or at least 30%. Non-limiting examples of reflective and/or translucent particles include aluminum, micas, or a mixture thereof.

The reflective and/or translucent particles can have an average particle size of at least 1 micron, at least 3 microns, at least 5 microns, at least 10 microns, at least 20 microns, or at least 30 microns. The reflective and/or translucent particles can have an average particle size of up to 60 microns, up to 50 microns, or up to 40 microns. The reflective and/or translucent particles can also have an average particle size such as from 1 micron to 60 microns, 10 microns to 60 microns, 30 microns to 60 microns, 1 micron to 10 microns, or 1 micron to 6 microns.

Further, a blend of different reflective and/or translucent particles having different particle sizes can also be used with the coating compositions that form the second coating layer. For example, the reflective and/or translucent particles can include aluminum particles having a particle size of less than 6 microns and/or micas having a particle size of 30 to 60 microns. In addition, aluminum particles and micas can be combined at different ratios to form the reflective and/or translucent particles of the second coating layer.

The film-forming resin and reflective and/or translucent particles can all be mixed together in a liquid medium and applied to over the light diffusing basecoat to form a multi-layer coating that transmits and reflects light. The liquid medium can include a non-aqueous liquid medium as previously described. The second coating composition can also be applied over the first coating layer using any of the methods previously described, such as electrocoating, spraying, electrostatic spraying, dipping, rolling, brushing, and the like. After the second coating composition is applied to the first coating layer, the second coating composition can be dried or cured at ambient conditions, with heat, or with other means such as actinic radiation. Thus, each coating composition can be applied as a dry-on-dry process where each coating composition is dried or cured prior to application of another composition. Alternatively, all or certain combinations of each coating composition described herein can be applied as a wet-on-wet process and dried or cured together.

The second coating layer, which contains the reflective and/or translucent particles, can be applied to a dry film thickness of 2 microns to 25 microns, 5 microns to 20 microns, or 10 microns to 20 microns.

The first and second coating compositions described herein have been found to form a multi-layer coating with good hiding, good light transmittance, and good light reflectance. For example, the first and second coating layer together can have an L value measured at a 15° angle of at least 110, at least 120, or at least 130. At the same time, the first and second coating layer together can also have a light transmittance of at least 8%, at least 10%, at least 12%, or at least 15%. Further, the first and second coating layer together may also exhibit good light reflectance.

Additional coating layers can also be added to the multi-layer coating previously described. For instance, the multi-layer coating can also include a third coating layer formed over the second coating layer. The third coating layer can be formed from a coating composition that includes a film forming resin and a colorant such as an inorganic pigment particle for example. The film-forming resin and colorant can include any of the resins and colorants previously described. For example, the third coating composition can include black pigment particles to form a black outer coating over the second coating layer.

The multi-layer coating can also include a clear coating layer. As used herein, a "clear coating layer" refers to a coating layer that is transparent. The term "transparent" refers to a coating wherein a surface beyond the coating is visible to the naked eye when viewed through the coating. The clear coating layer can be formed from a coating composition that can include any of the film forming resins previously described. The coating composition can also include any of the colorants previously described. Such colorants can be added in a manner that does not interfere with the desired transparency of the clear coating layer. Further, the clear coating layer can be positioned between the second and third coating layer to protect the second coating layer during a keycap etching process. A keycap etching process typically uses a laser or other device to penetrate through a coating layer and form a design, such as a number or letter found on a keyboard. By positioning a clear coating layer between the second and third coating layers described herein, the clear coating layer can protect the second coating layer from damage during the etching process.

Additionally, the multi-layer coating can further include an abrasion resistant topcoat. The abrasion resistant topcoat can comprise a clear/transparent coating layer formed over the outermost coating layer of the multi-layer coating system. For example, the abrasion resistant topcoat can be formed over the third coating layer after an etching process is performed. The abrasion resistant topcoat can protect against scratches, scuffing, marring, and other physical damage. The abrasion resistant topcoat can also comprise other properties such as chemical resistance, anti-fingerprinting, and soft touch properties.

The third coating layer, clear coating layer, and abrasion resistant topcoat can be applied using any of the methods previously described, such as electrocoating, spraying, electrostatic spraying, dipping, rolling, brushing, and the like. Further, each coating composition can be applied as a dry-on-dry process. Alternatively, all or certain combinations of each coating composition can be applied as a wet-on-wet process and dried or cured together.

Any of the coating compositions described herein can include additional materials. Non-limiting examples of additional materials that can be used with the coating compositions of the present invention include plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

The following examples are presented to demonstrate the general principles of the invention. The invention should not be considered as limited to the specific examples presented. All parts and percentages in the examples are by weight unless otherwise indicated.

EXAMPLE 1

Preparation of a Light Diffusing Coating Composition

Three (3) light diffusing basecoatcoating compositions were prepared from thecomponents listed in Table 1.

TABLE 1

| Components | Basecoat 1 (grams) | Basecoat 2 (grams) | Basecoat 3 (grams) |
|---|---|---|---|
| Dianal MB-2952 resin solution[1] | 34.73 | 34.78 | 34.82 |
| Dianal LR-7671[2] | 10.50 | 10.52 | 10.53 |
| CAB381-2 solution[3] | 7.73 | 7.74 | 7.74 |
| Methyl ethyl ketone | 9.89 | 10.00 | 10.00 |
| AFCONA-3777[4] | 0.41 | 0.42 | 0.42 |
| Ceraflour 996[5] | 2.76 | 2.77 | 2.77 |
| TiO$_2$ Intermediate[6] | 0.57 | 0.57 | 0.57 |
| Cross-linked organic particle Intermediate[7] | 8.41 | 5.61 | 3.38 |
| BaSO$_4$ Intermediate[8] | 5.44 | 7.26 | 8.73 |
| Acetone | 7.59 | 7.90 | 8.41 |
| 2-Butoxyethanol | 2.17 | 2.26 | 2.33 |
| Ethyl Acetate | 9.77 | 10.17 | 10.30 |

[1]Acrylic resin, commercially available from Shanghai Nagase Trading Co., LTD, mixed with methyl ethyl ketone and N-butyl acetate.
[2]Acrylic resin, commercially available from Mitsubishi Rayon Company, LTD.
[3]Cellulose acetate butyrate, commercially available from Eastman Chemical Company, mixed with methyl ethyl ketone and N-butyl acetate.
[4]Flurocarbon modified polymer, commercially available from Afcona Additives.
[5]Micronized PTFE-modified polyethylene wax, commercially available from BYK-CeraB.V.
[6]A titanium dioxide intermediate solution prepared from acrylic resin, Aromatic 100 (aromatic hydrocarbon mixture, commercially available from Ashland Inc.), DISPERBYK ® 110 (saturated polyester with acidic groups, commercially available from BYKChemie GMBH), N-butyl acetate, methyl ether propylene glycol, BENTONE ® 34 (montmorillonit clay, commercially available from Elementis Specialties), TRONOX ® CR 826 (titanium dioxide, commercially available from Tronox Inc.), and Microtalc CM2 (hydrated magnesium silicate, commercially available from Soc. Industries Lombarda).
[7]An intermediate solution containing crosslinked organic particles was prepared from SX-350H (crosslinked styrene particles, commercially available from Soken Chemical & Engineering Co., LTD.), Dianal MB-2952 (acrylic resin, commercially available from Shanghai Nagase Trading Co., LTD), DISPERBYK ® 110 (saturated polyester with acidic groups,commercially available from BYKChemie GMBH), isopropanol, xylene, ethyl acetate, N-butyl acetate, and methyl ether propylene glycol.
[8]A barium sulfate intermediate solution was prepared from blanc fixe (barium sulfate, commercially available from Sachtleben Corporation), Dianal MB-2952 (acrylic resin, commercially available from Shanghai Nagase Trading Co., LTD), DISPERBYK ® 110 (saturated polyester with acidic groups,commercially available from BYKChemie GMBH), isopropanol, xylene, ethyl acetate, N-butyl acetate, and methyl ether propylene glycol.

The components of samples 1, 2, and 3 were weighed in a half pint container and mixed with a paddle blade air motor stirrer for 20 minutes. After the components of each sample were mixed, each mixed sample was diluted with a solvent blend (blend of 2-butoxyethanol,methyl ethyl ketone, acetone, and ethyl acetate) at a ratio of solvent to sample of 2:1.

EXAMPLE 2

Preparation of a Reflective and Light Diffusing Coating Composition

A reflective and light diffusing coating composition was prepared from thecomponents listed in Table 2.

TABLE 2

| Components | Weight (grams) |
|---|---|
| Dianal MB-2952 resin solution[1] | 44.97 |
| Dianal LR-7671[2] | 14.99 |
| CAB 381-2 solution[3] | 9.99 |
| Methyl ethyl ketone | 9.99 |
| Disparlon NS-5501[9] | 5.00 |
| Disparlon 4200-10[10] | 1.00 |
| Afcona-3777[4] | 0.50 |
| Amorso-475[11] | 2.00 |
| METALURE ® 55700[12] | 3.28 |

[9]Hybrid thixotropic agent, commercially available from Kusumoto Chemicals, LTD.
[10]Polyolefin xylol dispersion, commercially available from Kusumoto Chemicals, LTD.
[11]Polyester resin, commercially available from Amorson Inc.
[12]Aluminum pigment dispersion, commercially available from Eckart GMBH & Co.

All the components listed in Table 2, except for METALURE® 55700, were weighed in a half pint container and mixed with a paddle blade air motor stirrer for 5 minutes. METALURE® 55700 was then added under agitation. The mixture was allowed to mix for 20 minutes. The final mixture was then diluted with a solvent blend (blend of 2-butoxyethanol, methyl ethyl ketone, acetone, and ethyl acetate) at a ratio of solvent to mixture of 2:1.

EXAMPLE 3

Preparation and Evaluation of a Multi-Layer Coating that Transmits and Reflects Light The light diffusing coating compositions of basecoat coating compositions 1-3 of Example 1 were hand shaken and sprayed onto clear polycarbonate plastic panels or keyboard key substrates. Application onto the substrates was performed with a Spraymation unit with a Binks model 95A spray gun with a 66S nozzle and pin set-up. The compositions were sprayed at a 25 psi air pressure 6 inches from the substrate with a 1 inch index drop for each pass. After application, each composition was allowed to flash for ten minutes. The compositions were then dried to form a coating.

The reflective and light diffusing coating compositions of Example 2 were then sprayed over the basecoats formed from the compositions of Example 1. The composition of Example 2 was sprayed with a Spraymation unit with a Binks model 95A spray gun with a 66S nozzle and pin set-up. The compositions were sprayed at a 25 psi air pressure 6 inches from the coated substrate with a 1 inch index drop for each pass. After application, each composition was allowed to flash for ten minutes. The reflective and light diffusing coating compositions were then baked for 30 minutes at 120° F. Various properties of the multi-layer coating were evaluated including the light transmittance and L values. These properties are shown in Table 3.

TABLE 3

| Multi-layer Coat | Visual Observation | Basecoat average dry-film thickness (μm)[13] | Silver second coat average dry-film thickness (μm)[13] | L-Value at 15°[14] | Light Transmission (%)[15] |
|---|---|---|---|---|---|
| Basecoat 1 | Cannot see light source through panel | 6.3 | 5.7 | 131 | 15 |
| Basecoat 2 | Cannot see light source through panel | 6.3 | 5.9 | 135 | 16 |
| Basecoat 3 | Cannot see light source through panel | 6.4 | 5.8 | 134 | 14 |

[13] Dry film thickness determined with a Deltascope film build instrument.
[14] L-value was determined with a GRETAGMACBETH COLOR-EYE® 2145 Spectrophotometer using the CIE94 color system using L*a*b* coordinates.
[15] Light transmission determined was with a NIPPON DENSHOKU, NDH 2000N Turbidity (Haze) Meter.

As shown in Table 3, multi-layer coatings 1-3 each exhibited good hiding, good light transmission, and good light reflectance.

The present invention is also directed to the following clauses.

Clause 1: A multi-layer coating that transmits and reflects light comprising: (a) a first coating layer prepared from a coating composition comprising a film forming resin, crosslinked organic particles, and inorganic pigment particles, wherein the crosslinked organic particles and the inorganic pigment particles each have a refractive index that is different from the refractive index of the film forming resin; and (b) a second coating layer applied over the first coating layer, the second coating layer prepared from a coating composition comprising a film forming resin and reflective and/or translucent particles.

Clause 2: The multi-layer coating of clause 1, wherein a difference between the refractive index of the crosslinked organic particles and the film forming resin is from 0.01 to 0.2.

Clause 3: The multi-layer coating of any of clauses 1 or 2, wherein the film forming resin of the coating composition of the first coating layer and/or the second coating layer comprises a (meth)acrylic resin.

Clause 4: The multi-layer coating of any of clauses 1-3, wherein the film forming resin of the coating composition of the first coating layer and/or the second coating layer is completely free of reactive functional groups.

Clause 5: The multi-layer coating of any of clauses 1-4, wherein the crosslinked organic particles comprise methyl (meth)acrylate particles, styrene particles, acrylonitrile particles, polymethyl ureaparticles, silicone polymers particles, vinyl acetate particles, sulfur-containing particles, fluoro-containing particles, or a combination thereof.

Clause 6: The multi-layer coating of any of clauses 1-5, wherein the crosslinked organic particles have an average particle size of 0.1 micron to 10 microns.

Clause 7: The multi-layer coating of any of clauses 1-6, wherein the crosslinked organic particles have a particle size distribution of 1 micron to 8 microns.

Clause 8: The multi-layer coating of any of clauses 1-7, wherein the inorganic pigment particles comprise titanium dioxide, zinc oxide, barium sulfate, calcium carbonate, talc, or combinations thereof.

Clause 9: The multi-layer coating of any of clauses 1-7, wherein the inorganic pigment particles comprise a pigment blend comprising (i) titanium dioxide and (ii) at least one other inorganic pigment particle that is different from titanium dioxide, wherein the titanium dioxide comprises less than 30 weight % of the total solids weight of the inorganic pigment particles and the crosslinked organic particles.

Clause 10: The multi-layer coating of any of clauses 1-9, wherein the first coating layer coating composition has a weight ratio of pigment particles to film forming resin of 1:1 to 1:10.

Clause 11: The multi-layer coating of any of clauses 1-10, wherein the reflective and/or translucent particles comprise aluminum, micas, or a mixture thereof.

Clause 12: The multi-layer coating of clause 11, wherein the aluminum particles have a particle size of less than 6 microns.

Clause 13: The multi-layer coating of clause 11, wherein the micas have a particle size of 30 to 60 microns.

Clause 14: The multi-layer coating of any of clauses 1-13, wherein the first and second coating layer together have a light transmittance of at least 8% and an L value measured at a 15° angle of greater than 110.

Clause 15: The multi-layer coating of any of clauses 1-14, further comprising a third coating layer applied over the second coating layer, wherein the third coating layer is prepared from a coating composition comprising inorganic pigment particles and a film forming resin.

Clause 16: The multi-layer coating of any of clauses 1-15, further comprising a clear layer positioned between the second coating layer and the third coating layer.

Clause 17: The multi-layer coating of any of clauses 1-16, further comprising an abrasion resistant topcoat applied over the third coating layer.

Clause 18: A substrate at least partially coated with the multi-layer coating of any of clauses 1-17.

Clause 19: The at least partially coated substrate of clause 18, wherein the substrate is a plastic substrate.

Clause 20: The at least partially coated substrate of any of clauses 18 or 19, wherein the substrate is a keyboard comprising a light source.

Whereas particular embodiments of this invention have been described above for purposes of illustration, it will be evident to those skilled in the art that numerous variations of the details of the present invention may be made without departing from the invention as defined in the appended claims.

The invention claimed is:

1. A multi-layer coating that transmits and reflects light comprising:
   a) a first coating layer prepared from a coating composition comprising a film forming resin, crosslinked organic particles, and inorganic pigment particles, wherein the crosslinked organic particles and the inorganic pigment particles each have a refractive index that is different from the refractive index of the film forming resin, and wherein the inorganic pigment particles comprise a pigment blend comprising (i) titanium dioxide and (ii) at least one other inorganic pigment particle that is different from titanium dioxide, wherein the titanium dioxide comprises less than 30 weight % 15 weight % of the total solids weight of the inorganic pigment particles and the crosslinked organic particles; and
   b) a second coating layer applied over the first coating layer, the second coating layer prepared from a coating composition comprising a film forming resin and reflective and/or translucent particles,
   wherein the first and second coating layers together have a light transmittance of at least 8%.

2. The multi-layer coating of claim 1, wherein a difference between the refractive index of the crosslinked organic particles and the film forming resin is from 0.01 to 0.2.

3. The multi-layer coating of claim 1, wherein the film forming resin of the coating composition of the first coating layer and/or the second coating layer comprises a (meth) acrylic resin.

4. The multi-layer coating of claim 1, wherein the film forming resin of the coating composition of the first coating layer and/or the second coating layer is completely free of reactive functional groups.

5. The multi-layer coating of claim 1, wherein the crosslinked organic particles comprise methyl (meth)acrylate particles, styrene particles, acrylonitrile particles, polymethyl urea particles, silicone polymers particles, vinyl acetate particles, sulfur-containing particles, fluoro-containing particles, or a combination thereof.

6. The multi-layer coating of claim 1, wherein the crosslinked organic particles have an average particle size of 0.1 micron to 10 microns.

7. The multi-layer coating of claim 1, wherein the crosslinked organic particles have a particle size distribution of 1 micron to 8 microns.

8. The multi-layer coating of claim 1, wherein the at least one other inorganic pigment particle that is different from titanium dioxide comprises zinc oxide, barium sulfate, calcium carbonate, talc, or combinations thereof.

9. The multi-layer coating of claim 1, wherein the first coating layer coating composition has a weight ratio of inorganic pigment particles to film forming resin of 1:1 to 1:10.

10. The multi-layer coating of claim 1, wherein the reflective and/or translucent particles comprise aluminum, micas, or a mixture thereof.

11. The multi-layer coating of claim 10, wherein the aluminum particles have a particle size of less than 6 microns.

12. The multi-layer coating of claim 10, wherein the micas have a particle size of 30 to 60 microns.

13. The multi-layer coating of claim 1, wherein the first and second coating layer together have an L value measured at a 15° angle of greater than 110.

14. The multi-layer coating of claim 1, further comprising a third coating layer applied over the second coating layer, wherein the third coating layer is prepared from a coating composition comprising inorganic pigment particles and a film forming resin.

15. The multi-layer coating of claim 14, further comprising a clear layer positioned between the second coating layer and the third coating layer.

16. The multi-layer coating of claim 14, further comprising an abrasion resistant topcoat applied over the third coating layer.

17. The multi-layer coating of claim 1, wherein the titanium dioxide comprises less than 10 weight % of the total solids weight of the inorganic pigment particles and the crosslinked organic particles.

18. A substrate at least partially coated with the multi-layer coating of claim 1.

19. The at least partially coated substrate of claim 18, wherein the substrate is a plastic substrate.

20. The at least partially coated substrate of claim 18, wherein the substrate is a keyboard comprising a light source.

* * * * *